(12) United States Patent
Berlic et al.

(10) Patent No.: US 10,614,701 B2
(45) Date of Patent: Apr. 7, 2020

(54) MONITORING SYSTEM FOR SECURITY TECHNOLOGY

(71) Applicant: Irisity AB (publ), Göteborg (SE)

(72) Inventors: Johnny Berlic, Göteborg (SE); Victor Hagelbäck, Nödinge (SE)

(73) Assignee: Irisity AB (publ), Göteborg (SE)

( * ) Notice: Subject to any disclaimer, the term of this patent is extended or adjusted under 35 U.S.C. 154(b) by 0 days.

(21) Appl. No.: 16/307,607

(22) PCT Filed: May 24, 2017

(86) PCT No.: PCT/SE2017/050563
§ 371 (c)(1),
(2) Date: Dec. 6, 2018

(87) PCT Pub. No.: WO2017/217906
PCT Pub. Date: Dec. 21, 2017

(65) Prior Publication Data
US 2019/0304293 A1 Oct. 3, 2019

(30) Foreign Application Priority Data
Jun. 17, 2016 (SE) ...................................... 1650861

(51) Int. Cl.
*G08B 29/04* (2006.01)
*G08B 13/196* (2006.01)
*H04L 12/26* (2006.01)
*G08B 13/00* (2006.01)

(52) U.S. Cl.
CPC ......... *G08B 29/04* (2013.01); *G08B 13/1966* (2013.01); *G08B 13/19656* (2013.01); *G08B 13/19693* (2013.01); *H04L 43/0817* (2013.01); *G08B 13/00* (2013.01)

(58) Field of Classification Search
CPC .............. G08B 29/04; G08B 13/19656; G08B 13/1966; H04L 43/0817
USPC ......................................................... 340/506
See application file for complete search history.

(56) References Cited

U.S. PATENT DOCUMENTS

| | | | |
|---|---|---|---|
| 5,293,556 A | 3/1994 | Hill et al. | |
| 7,373,552 B2* | 5/2008 | Bjorsne | G06F 11/0748 714/37 |
| 9,084,937 B2* | 7/2015 | Gadher | G06F 11/008 |
| 9,531,968 B2* | 12/2016 | Boorom | H04N 5/374 |
| 9,766,993 B2* | 9/2017 | Agrawal | H04L 67/12 |

(Continued)

FOREIGN PATENT DOCUMENTS

| | | |
|---|---|---|
| EP | 2698740 A2 | 2/2014 |
| WO | 2015086448 A1 | 6/2015 |

OTHER PUBLICATIONS

International Search Report and Written Opinion dated Aug. 21, 2017 for PCT International Application No. PCT/SE2017/050563, 11 pages.

(Continued)

*Primary Examiner* — John A Tweel, Jr.
(74) *Attorney, Agent, or Firm* — RMCK Law Group, PLC

(57) ABSTRACT

The present invention relates to the operation of a monitoring system for security technology, specifically for swift handling of possible issues with surveillance devices configured to carry out predetermined surveillance tasks. The invention also relates to a corresponding method and a computer program product.

16 Claims, 2 Drawing Sheets

(56) References Cited

U.S. PATENT DOCUMENTS

| | | | |
|---|---|---|---|
| 9,979,791 B2* | 5/2018 | Aw | G08B 13/19656 |
| 9,997,053 B2* | 6/2018 | Maneskiold | G08B 13/19606 |
| 2005/0002561 A1 | 1/2005 | Monachino et al. | |
| 2005/0034057 A1 | 2/2005 | Hull et al. | |
| 2006/0085689 A1 | 4/2006 | Bjorsne | |
| 2010/0014717 A1 | 1/2010 | Rosenkrantz | |
| 2013/0050502 A1 | 2/2013 | Saito et al. | |
| 2013/0190095 A1 | 7/2013 | Gadher et al. | |
| 2015/0310720 A1 | 10/2015 | Gettings et al. | |
| 2016/0092290 A1 | 3/2016 | Gerstl et al. | |

OTHER PUBLICATIONS

Swedish Search Report dated Dec. 23, 2016 for Swedish Patent Application No. 1650861-6, 3 pages.
Extended European Search Report dated Dec. 16, 2019 for European Application No. 17813685.9, 10 pages.

* cited by examiner

MONITORING SYSTEM FOR SECURITY TECHNOLOGY

CROSS-REFERENCE TO RELATED APPLICATIONS

This application is a 371 U.S. National Stage of International Application No. PCT/SE2017/050563, filed May 24, 2017, which claims priority to Swedish Application No. 1650861-6, filed on Jun. 17, 2016. The disclosures of each of the above applications are incorporated herein by reference in their entirety.

TECHNICAL FIELD

The present invention relates to the operation of a monitoring system for security technology, specifically for swift handling of possible issues with surveillance devices configured to carry out predetermined surveillance tasks. The invention also relates to a corresponding method and a computer program product.

BACKGROUND OF THE INVENTION

In using a conventional surveillance system, a plurality of cameras are typically used for monitoring and surveillance of different locations of interest, where the video streams generated by the plurality of cameras are summoned to a human operator for deciding if any abnormalities exists. In some instances, the surveillance system may additionally comprise a computer system performing video processing of the video streams, such that the human operator only needs to be involved if the computer system automatically has decided that an abnormality is present, e.g. a possible alarm condition that needs interaction by the human operator. A surveillance system may also comprise further surveillance devices, such as motion detectors (e.g. PIR), magnetic contacts, passage control arrangements, etc.

With an increasing number of surveillance devices follows an increased complexity in operating and supporting the surveillance system, for example including issues following misuse or sabotage of a surveillance device, or due to a hardware error with a surveillance device. In addition, different surveillance systems will include different surveillance devices, for example due to differences in physical set-up of the sites where the specific surveillance system is installed, as well as due to local regulations. Accordingly, there will be an ever increasing complexity for support personnel to handle issues, for example errors, relating to surveillance devices comprised with a surveillance system.

Thus, it would be desirable to introduce a monitoring system simplifying the handling of issues relating to surveillance devices configured to carry out predetermined surveillance tasks, whereby a possible downtime for the surveillance devices may be reduced. It would also be advantageous to possibly allow for an automated handling of at least some of the issues, thereby reducing the necessity of dispatching support personnel to the site where the possibly incorrectly functioning surveillance device is located, thereby reducing the overall operational cost for surveillance of a specific site where the surveillance devices are provided.

SUMMARY OF THE INVENTION

According to an aspect of the invention, the above is at least partly met by a monitoring system for surveillance security technology, the monitoring system comprising a server configured to receive, over a network, information packages relating to a plurality of surveillance devices configured to carry out predetermined surveillance tasks, and a database arranged in communication with the server and configured to store the received information packages, wherein the server is arranged to, for each of the received information packages receive issue information for the surveillance device, the issue information comprised with the information package, identify at least one related information package previously stored in the database based on at least one of the issue information and a profile for the surveillance device, determine a matching level between the received information package and the identified information package, select, if the matching level is above a predetermined threshold, a solution message relating to the selected information package, and provide the solution message to a computing device for handling an issue at the surveillance device, the computing device connected to the server and the plurality of surveillance devices.

By means of the invention, in case there is an issue with any of the included surveillance devices, information relating to the issue is provided (reported) to a server, where the server is configured to find a solution to the issue based on information comprised in a pre-populated database provided in communication with the server. A message relating to the solution is subsequently communicated to a computing device connected to both the server and the surveillance device, whereby an action may be taken for swiftly handling the issue with the e.g. presently unsatisfyingly operating surveillance device.

Advantages following the proposed solution lie in the possibility of providing targeted solutions to issues with surveillance device, typically based on previous related/similar issues with other surveillance devices, not necessarily positioned at the same location as the presently unsatisfyingly operating surveillance device. This approach may drastically reduce the time it takes to once again get the presently unsatisfyingly operating surveillance device to be operating correctly again. In some embodiment, the solution message is comprised with information provided to support personnel for handling the issue. In such a case the issue information and the solution message may be used for improved troubleshooting and handling of the issue with the surveillance device.

As an alternative, the solution message may be provided to surveillance personnel operating the computing device, where the computing device may be provided with a user interface for interacting with e.g. settings relevant for the surveillance device, for example for changing a setting for the surveillance device, for restarting the surveillance device (if relevant), etc. The provision of the issue information to the server may in some embodiments involve the operator forming the information package using the user interface of the computing device (or similar).

It should be understood that a surveillance profile may be defined for each or a group of surveillance devices, where the surveillance profile for example may define how it is desired to handle a generated alarm/incident. The surveillance profile may possibly be defined at the time of installing the surveillance device(s) and/or could be updated/formed along the line of operating the surveillance device(s).

The information package may also be formed automatically, e.g. by the surveillance device or by an intermediately arranged control unit, communication wise "arranged between" the surveillance device and the server. For example, the issue information automatically transmitted from the surveillance device to the server may include an issue code generated at the surveillance device. The intermediately arranged control unit may relay similar information to the server, or may alternatively generate its own issue information, for example in a case where the surveillance device stops sending information to the intermediately arranged control unit. Accordingly, the intermediately arranged control unit may be configured to be in repeated communication with the surveillance device, e.g. for receiving a "heart-beat" signal from the surveillance device, provided for continuously keeping the intermediately arranged control unit updated as to the current status of the surveillance device.

In a possible embodiment of the invention the issue at the surveillance device relates to a possible error related to the surveillance device. Such an error may for example be that general alarm information generated by the surveillance device becomes corrupt, or that the surveillance device stops generating alarm information all together.

In one possible implementation of the invention, at least one of the surveillance devices comprises an image capturing device providing a stream of images (video stream) of an area monitored by that specific surveillance device. In such a case the lack of the provision of the video stream may be defined as an issue/error, or the corruption of all or part of the generated video stream.

Preferably, the server further comprises a categorization module and the categorization module is configured to categorize the information packages stored in the database. Accordingly, the information packages within the database may be clustered based on how they correlate to each other. That is, similar issues/errors may be defined to be related and may be grouped together. Once a group of similar issues/errors has been determined, it may be possible to form the solution message to be suitable as a response to all of the different issues/error considered to be related (i.e. but not necessarily identical).

Following that the solution message has been provided to the computing device, the computing device may be configured to generate and transmit a feedback message to the server. The feedback message may in one embodiment be a message generated by the surveillance device and identifying that the surveillance device once again is functioning as desired, or alternatively is still not functioning properly. In another embodiment the feedback message is instead/also generated by the operator e.g. viewing the video stream generated by the (video) surveillance device, identifying that the surveillance device once again is functioning as desired, or is still not functioning properly. As understood, the feedback message may be used for verifying if the solution message in fact did solve the previous issue at the surveillance device. The feedback message may also be allowed to function for updating the solution message, e.g. in case the solution message only partly solved the issue at the surveillance device.

In an embodiment of the invention the profile for the surveillance device comprises information relating to a hardware profile for the surveillance device. Accordingly, surveillance devices providing similar functionality but having different hardware profiles may be allowed to be treated at least partly differently when it comes to providing a suitable solution message. In addition, it may in accordance to the invention be possible to allow a follow-up to be made based on different types of hardware profiles for allowing future installations to be improved as to its reliability. That is, in case a specific type of surveillance device having a specific type of hardware profile has shown to be unreliable, it may be possible to refrain from installing such a surveillance device when a new surveillance site is set-up.

In a possible embodiment of the invention it may be possible to allow also an alarm generated at the surveillance device, e.g. in the form of an incident report, to be provided to the server. The incident report may in a similar manner as discussed above be correlated with further information relating to the specific (type of) surveillance device with the purpose of generating an even more accurate solution message.

The monitoring system is preferably arranged as a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved. That is, by applying a distributed approach to the server(s) allows for an improved security.

According to another aspect of the present invention there is provided a computer implemented method for operating a monitoring system, the monitoring system comprising a server configured to receive, over a network, information packages relating to a plurality of surveillance devices configured to carry out predetermined surveillance tasks, and a database arranged in communication with the server and configured to store the received information packages, the method comprising the steps of, for each of the received information packages receiving issue information for the surveillance device, the issue information comprised with the information package, identifying at least one related information package previously stored in the database based on at least one of the issue information and a profile for the surveillance device, determining a matching level between the received information package and the identified information package, selecting, if the matching level is above a predetermined threshold, a solution message relating to the selected information package, and providing the solution message to a computing device for handling an issue at the surveillance device, the computing device connected to the server and the plurality of surveillance devices. This aspect of the invention provides similar advantages as discussed above in relation to the previous aspect of the invention.

According to a still further aspect of the present invention there is provided a computer program product comprising a non-transitory computer readable medium having stored thereon computer program means for operating a monitoring system, the monitoring system comprising a server configured to receive, over a network, information packages relating to a plurality of surveillance devices configured to carry out predetermined surveillance tasks, and a database arranged in communication with the server and configured to store the received information packages, wherein the computer program product comprises, for each of the received information packages code for receiving issue information for the surveillance device, the issue information comprised with the information package code for identifying at least one related information package previously stored in the database based on at least one of the issue information and a profile for the surveillance device, code for determining a matching level between the received information package and the identified information package, code for selecting, if the matching level is above a predetermined threshold, a solution message relating to the selected information package, and code for providing the solution message to a computing device for handling an issue at the surveillance device, the computing device connected to the server and the plurality of surveillance devices. Also this aspect of the invention provides similar advantages as discussed above in relation to the previous aspects of the invention.

A software executed by the server for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realizes that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
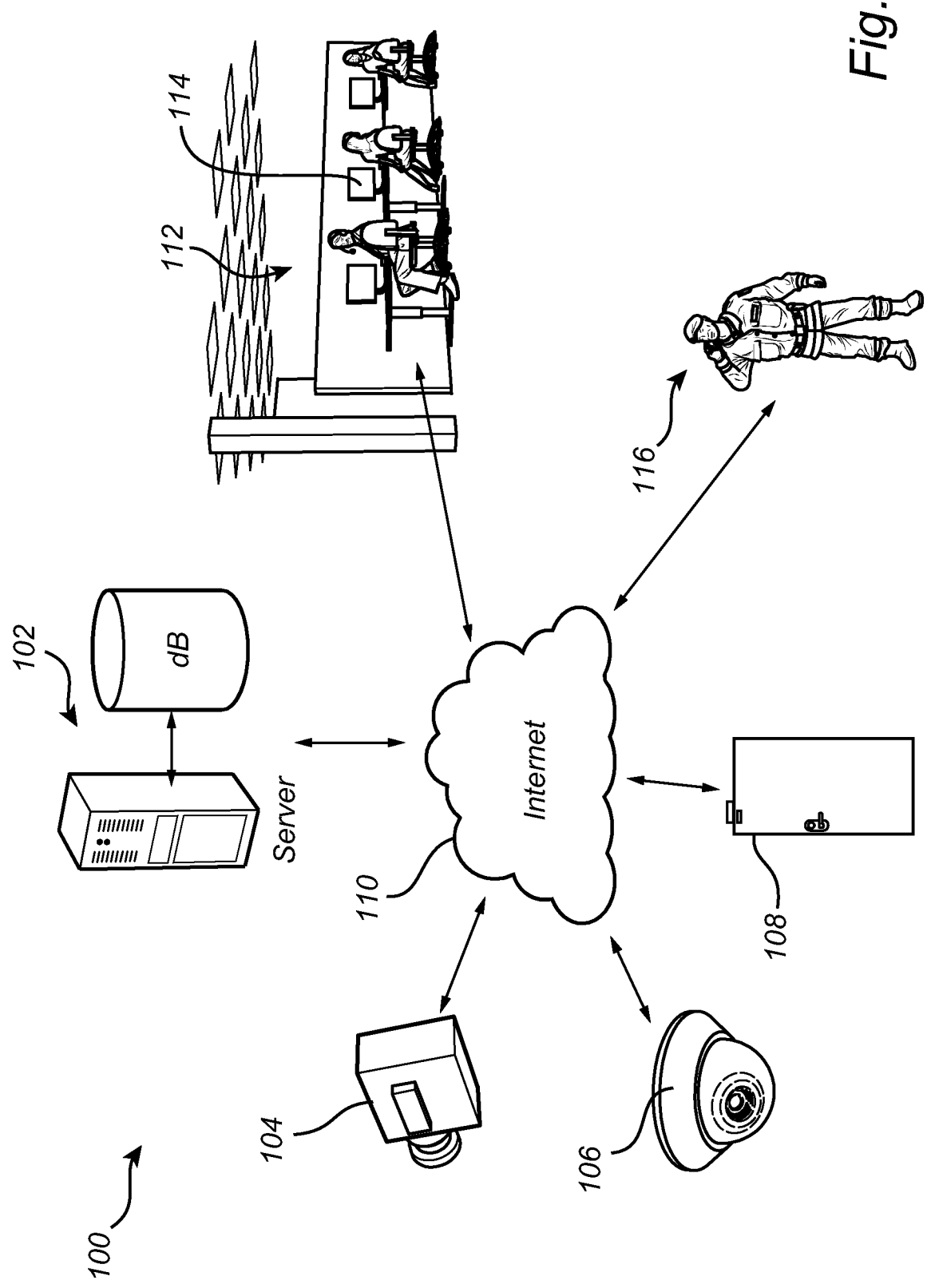
FIG. 1 illustrates a monitoring system according to a currently preferred embodiment of the invention, FIG. 2 conceptually illustrates a flow of information within the monitoring system provided in accordance to the information.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a monitoring system 100 according to a possible embodiment of the invention. The monitoring system 100 comprises at least one server and database 102, a plurality of surveillance devices in the form of a pan-tilt-zoom (PTZ) video camera 104, a roof mounted video camera 106 and a door provided with a magnetic switch 108 for monitoring when the door is opened or closed. Generally, the surveillance devices 104, 106, 108 are installed and arranged to monitor a specific site, such as a construction site, a building, a home, etc.

In addition, a computing device 112 is provided, as part of or at a "monitoring site" where an operator is arranged in front of a display device 114 for receiving e.g. information from the surveillance devices 104, 106, 108. As an alternative, or also, a security guard may be provided with a portable electronic device 116 functioning as the computing device, where the portable electronic device is configured for allowing the security guard (or similar) to receive information from the surveillance devices 104, 106, 108. The computing device 112, 116 is preferably provided with a graphical user interface (GUI) allowing for the operator/ security guard to interact based on information provided from the server 102.

The server 102, the surveillance devices 104, 106, 108 and the computing devices 112/116 are all connected over a network 110, such as the Internet. The network 110 may be in part be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar.

It should be understood that further surveillance devices may be provided, that the surveillance devices 104, 106, 108 are only for illustrative purposes, and that the specific surveillance devices 104, 106, 108 shown are provided for illustrating that a monitoring (surveillance) system normally comprises a plurality of different types of surveillance devices, typically having different hardware configurations. Such further devices may for example include entry passage arrangements, motion (PIR) detectors, etc. Still further, the monitoring system 100 is preferably configured to allow surveillance devices at different sites to be included, where the sites may also be geographically spaced, e.g. in different cities, countries, etc.

Figure 3:
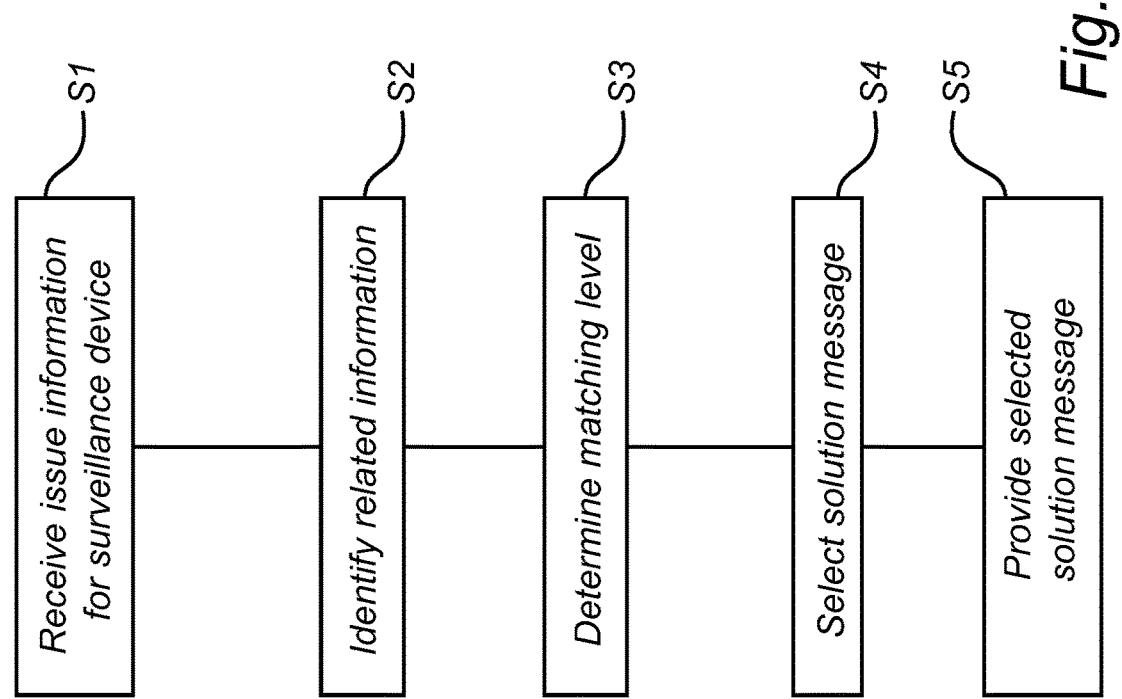
FIG. 3 shows a flow chart of a method according to an embodiment of the invention.
Figure 2:
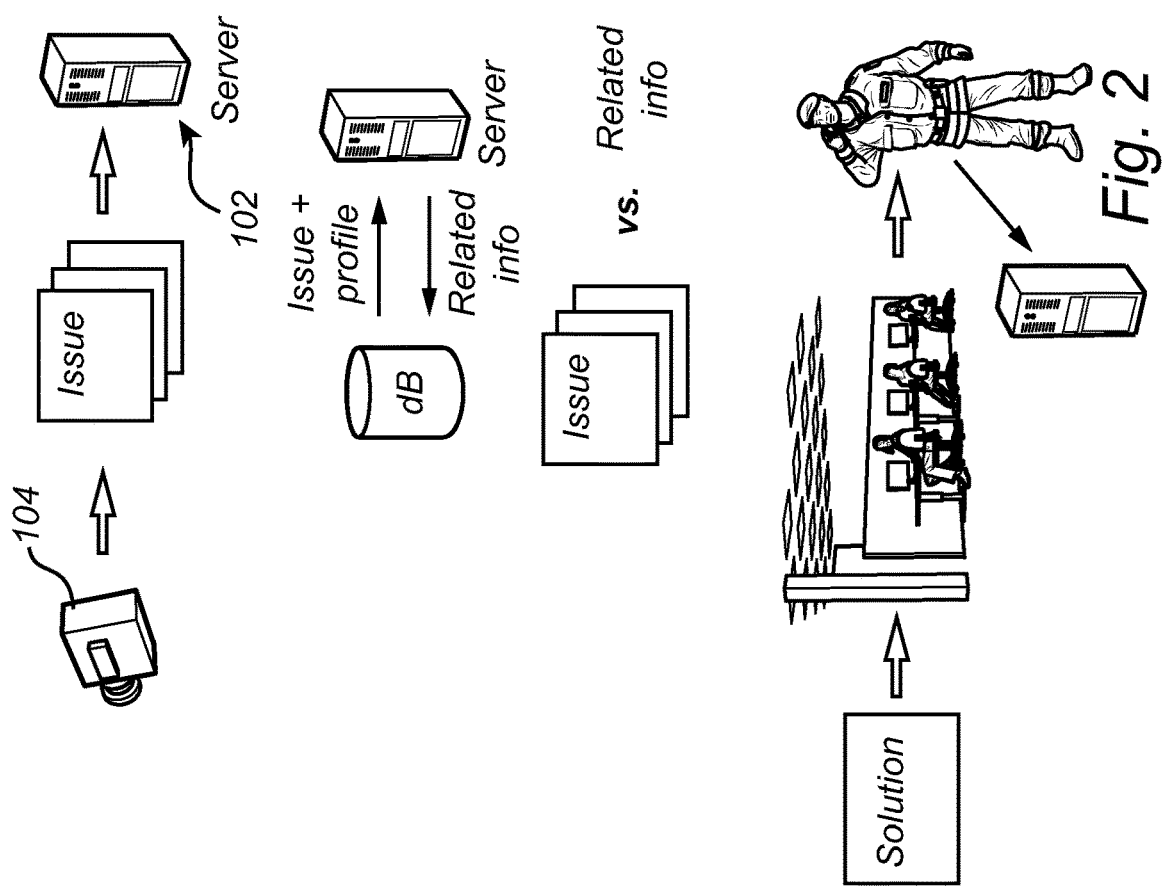

During operation of monitoring system 100, with reference also to FIGS. 2 and 3, e.g. video camera 104 at an instance in time may stop transmitting a video stream or images of the site where the camera 104 is installed (other issues/errors may of course take place). Alternatively, an intermediately arranged electronic device may be provided (not shown) for receiving information from the surveillance devices 104, 106, 108 and relaying the information to at least one of the server and the computing devices 112, 114. In such an installation, the intermediately arranged electronic device may stop to receive the above mentioned heart beat signal (transmitted from the camera 104 to the intermediately arranged electronic device for example once every second, minute, etc.) from at least one of the surveillance devices 104, 106, 108, such as from video camera 104.

Once for example such an issue/error takes place, the server 102 is configured to receive, S1, issue information from at least one of the video camera 104 and the intermediately arranged electronic device. The information is typically provided in data package form over the network 110. The server 102 will as a consequence search the thereto connected database to identify, S2, information that somewhat corresponds to the issue information provided form the camera 104. The server 102 may for example make use of profile information for the camera 104, for example including the make and model of the camera, the specific hardware profile for the camera 104, information relating to the intermediately arranged electronic device, etc.

Once information has been acquired from the database, the server 102 determines, S3, a matching level between the issue information provided from the camera 104 with the information previously stored within the database. The server 102 thus preferably comprises a matching module for performing the discussed matching functionality. The matching level could for example be dependent on a hardware correlation between the hardware profile for the camera 104 and information stored within the database (such as previously collected issues with a specific type of hardware for a camera), time based (similar problems occurring within a similar time frame, such as re-occurring within similar time frames, such as every afternoon, etc.), network related, etc.

Furthermore, it may be possible to e.g. "tag" the issue information with further data (possibly defined as metadata), such as information relating to the type of services provided in relation to the surveillance devices (e.g. subscription related), the weather condition at the site or the specific surveillance device. Accordingly, in case of e.g. a storm/rain, specific issues/errors may occur, and the monitoring system may automatically provide a solution message for solving the issue, for example relating to a proposal of installing physical structures in the surrounding of the surveillance device for limiting how a specific type of weather is affecting the site/surveillance device(s).

Still further, the metadata may also include the time of object that is under surveillance, the type or organization, the number of surveillance devices installed at the specific site, etc.

It is desirable to also relate "solutions" to the issue information with the information stored within the database. However, not all issues will have previously stored matching information, but rather a universal type of solutions may instead be fetched, e.g. from the database. Such universal solutions may for example be to check the network connection of the camera 104 (such as cabling or a new Wi-Fi password), reboot the camera 104, etc. It should further be understood that it may be desirable to allow e.g. the person acting on the solution message to report back a possible derivative of the solution that was proposed by means of the solution message. Accordingly, persons at different sites acting on solution messages may be given alternatives on how to solve an issue/error (e.g. first "try this", if not solving the issue/error "try that"). The overall desire is as understood to assist with quickly solving any issues arising with the surveillance devices, even for operators/security guards/handymen not having previous knowledge of the type/model/make of a specific security device, but rather provide automated solutions that is likely to solve the issue/error.

Based on the determined matching level and what type of solution information that has been introduced with the database, a solution message is selected, S4, and subsequently provided, S5, to the computing device 112, 116. The operator and/or the security guard will receive the solution message and may consequently act on the information for solving the issue/error with the camera 104. As understood, the operator and the security guard will have different possibility of physical "access" to the camera 104. The operator will typically only have the option to perform any type of solutions to the camera 104 "over the network" (virtual access), such as resetting the camera 104 or otherwise interact with the camera 104 or the intermediately arranged electronic device using some form of interacting software, such as for changing settings for the camera. The security guard, or a "handyman" may have direct (or allowed) physical access to the camera 104, for example making it possible to unplug the camera 104, change the camera 104 to another camera, etc., or making any other form of physical changes to the camera 104, such as for example redirecting the camera 104 in case the camera 104 had been deliberately moved to "look another way". The security guard/handyman may of course also be instructed by the operator to perform a specific action to try to solve the issue, where the action is based on the solution message provided from the server 102.

It should also be understood that the solution message in some embodiments could be provided to automatically try to solve the issue with the camera 104, such as by automatically changing a setting for the camera 104, rebooting the camera 104, etc. Alternatively, or also, the solution message may be provided for making semi-automated changes to the camera 104 for solving the issue, e.g. by allowing the operator/security guard to conform that a specific action should be taken to the camera 104.

In an advantageous embodiment of the invention, the operator/security guard/handyman is allowed to provide a response message once an action has been taken to the solution message, reporting back to the server 102 information relating to how the camera 104 reacted to the action resulting from the solution message from the server 102.

As understood, this implementation will allow for the server 102 to interactively learn if a specific solution message in fact solved the issue/error with the surveillance devices 104, 106, 108. Furthermore, as a large plurality of surveillance devices at different sites and installed in different ways will be interacting with the server 102 as to issue information, solution and response messages, the server 102 could be allowed to "learn" how to quickly react to a new issue at a first site, as this issue may have been encountered at a second site. Thus, it is typically desirable to allow the solution message to be "anonymous", i.e. that the solution message may not be possible to derive from a previous issue at a specific site. It should however also be understood that some issues may be site based, such as issues relating to a changed Wi-Fi password, electricity failure, etc.

Furthermore, the collection of a plurality of portions of issue information also from a specific site, e.g. for a specific surveillance device, allows the server 102 to find a trend for that specific surveillance device. That is, the server 102 may for example automatically determine that the specific surveillance device stops sending heart beat signals on Friday afternoons. Accordingly, a pattern may be identified by the server 102, and a solution message may be provided to the operator/security guard to try to identify what actions are taken at the site on every Friday afternoon. For example, the specific surveillance device could be installed on the same circuit breaker as some other equipment at the site, a circuit breaker that is turned off over the weekend. Thus, the server 102 will provide a continuity that may be hard to provide by operators/security guards that may not be monitoring the site every day/week.

In addition, the ability to collect issue information relating to a specific type of surveillance device may subsequently be used when installing new equipment at e.g. a "new" site. That is, it could be possible to query the server 102 and database for information relating to "reliable" surveillance devices, i.e. devices that generate an in comparison few numbers of errors, portions of issue information.

The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

In summary, the present invention relates to a monitoring system for surveillance security technology, the monitoring system comprising a server configured to receive, over a network, information packages relating to a plurality of surveillance devices configured to carry out predetermined surveillance tasks, and a database arranged in communication with the server and configured to store the received information packages, wherein the server is arranged to, for each of the received information packages receive issue information for the surveillance device, the issue information comprised with the information package, identify at least one related information package previously stored in the database based on at least one of the issue information and a profile for the surveillance device, determine a matching level between the received information package and the identified information package, select, if the matching level is above a predetermined threshold, a solution message relating to the selected information package, and provide the solution message to a computing device for handling an issue at the surveillance device, the computing device connected to the server and the plurality of surveillance devices.

By means of the invention, in case there is an issue with any of the included surveillance devices, information relating to the issue is provided to a server, where the server is configured to find a solution to the issue based on information comprised in a pre-populated database arranged in communication with the server. A message relating to the solution is communicated to a computing device connected to both the server and the surveillance device, whereby an action may be taken for swiftly handling the issue with the e.g. presently unsatisfyingly operating surveillance device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A monitoring system for surveillance security technology, the monitoring system comprising:
    a server configured to receive, over a network, information packages relating to a plurality of surveillance devices configured to carry out predetermined surveillance tasks, and
    a database arranged in communication with the server and configured to store the received information packages,
    wherein the server is arranged to, for each of the received information packages:
        receive issue information for the surveillance device, the issue information comprised with the information package;
        identify at least one related information package previously stored in the database based on at least one of the issue information and a profile for the surveillance device, wherein the profile for the surveillance device comprises information relating to a hardware profile for the surveillance device;
        determine a matching level between the received information package and the identified information package;
        select, if the matching level is above a predetermined threshold, a solution message relating to the selected information package, and
        provide the solution message to a computing device for handling an issue at the surveillance device, the computing device connected to the server and the plurality of surveillance devices.

2. The system according to claim 1, wherein the issue at the surveillance device relates to a possible error related to the surveillance device.

3. The system according to claim 1, wherein the server further comprises a categorization module and the categorization module is configured to:
    categorize the information packages stored in the database.

4. The system according to claim 3, wherein the categorization module is further configured to:
    identify relations between the individual information stored in the database, and
    group information packages identified to be related to each other.

5. The system according to claim 4, further comprising forming the solution message based on the grouped information packages.

6. The system according to claim 1, wherein the computing device is arranged to transmit a feedback message to the server following the reception of the solution message.

7. The system according to claim 6, wherein the solution message is updated based on the feedback message.

8. The system according to claim 1, wherein the computing device is arranged to automatically adjust a setting for the surveillance device based on the solution message.

9. The system according to claim 1, further comprising an intermediate control unit, arranged in communication with at least a portion of the plurality of surveillance device and the server, in between the portion of the plurality of surveillance device and the server.

10. The system according to claim 1, wherein the information package further comprises an incident report from the surveillance device.

11. The system according to claim 10, wherein the server is further configured to identify at least one related information package previously stored in the database based the incident report.

12. The system according to claim 1, wherein at least a sub-set of the plurality of surveillance devices comprises an image sensor, and the incident report comprises at least one of an image and a video providing a representation of a surveillance area for the surveillance devices.

13. The system according to claim 12, wherein the server further comprises a video analysis module and the video analysis module is configured to:
determine an incorrectness with the representation of the surveillance area.

14. The system according to claim 1, wherein the server is a cloud server.

15. A computer implemented method for operating a monitoring system, the monitoring system comprising:
a server configured to receive, over a network, information packages relating to a plurality of surveillance devices configured to carry out predetermined surveillance tasks, and
a database arranged in communication with the server and configured to store the received information packages,
the method comprising the steps of, for each of the received information packages:
receiving issue information for the surveillance device, the issue information comprised with the information package;
identifying at least one related information package previously stored in the database based on at least one of the issue information and a profile for the surveillance device, wherein the profile for the surveillance device comprises information relating to a hardware profile for the surveillance device;
determining a matching level between the received information package and the identified information package;
selecting, if the matching level is above a predetermined threshold, a solution message relating to the selected information package, and
providing the solution message to a computing device for handling an issue at the surveillance device, the computing device connected to the server and the plurality of surveillance devices.

16. A computer program product comprising a non-transitory computer readable medium having stored thereon computer program means for operating a monitoring system, the monitoring system comprising:
a server configured to receive, over a network, information packages relating to a plurality of surveillance devices configured to carry out predetermined surveillance tasks, and
a database arranged in communication with the server and configured to store the received information packages,
wherein the computer program product comprises, for each of the received information packages:
code for receiving issue information for the surveillance device, the issue information comprised with the information package;
code for identifying at least one related information package previously stored in the database based on at least one of the issue information and a profile for the surveillance device, wherein the profile for the surveillance device comprises information relating to a hardware profile for the surveillance device;
code for determining a matching level between the received information package and the identified information package;
code for selecting, if the matching level is above a predetermined threshold, a solution message relating to the selected information package, and
code for providing the solution message to a computing device for handling an issue at the surveillance device, the computing device connected to the server and the plurality of surveillance devices.

* * * * *